United States Patent [19]

Ittmann et al.

[11] Patent Number: 4,826,901

[45] Date of Patent: May 2, 1989

[54] CURABLE CASTING RESINS

[75] Inventors: Guenther Ittmann, Gross-Umstadt; Manfred Krieg, Darmstadt, both of Fed. Rep. of Germany

[73] Assignee: Röhm GmbH, Darmstadt, Fed. Rep. of Germany

[21] Appl. No.: 142,267

[22] Filed: Jan. 11, 1988

Related U.S. Application Data

[63] Continuation of Ser. No. 902,890, Sep. 2, 1986, abandoned.

[30] Foreign Application Priority Data

Sep. 7, 1985 [DE] Fed. Rep. of Germany ....... 3531913

[51] Int. Cl.$^4$ ................................................ C08K 5/52
[52] U.S. Cl. .................................... 324/145; 524/264; 524/547; 524/707
[58] Field of Search ................. 524/145, 264, 707, 547

[56] References Cited

U.S. PATENT DOCUMENTS

| | | | |
|---|---|---|---|
| 2,067,234 | 7/1941 | Gordon et al. ..................... | 524/707 |
| 2,339,775 | 1/1944 | Ether ................................. | 524/145 |
| 4,091,170 | 5/1978 | Godfrey ............................. | 524/145 |
| 4,221,697 | 9/1980 | Osborn et al. ................... | 252/188.31 |
| 4,251,576 | 2/1981 | Osborn et al. ...................... | 428/331 |

FOREIGN PATENT DOCUMENTS

| | | |
|---|---|---|
| 3331371 | 4/1984 | Fed. Rep. of Germany . |
| 3323951 | 1/1985 | Fed. Rep. of Germany . |
| 0045086 | 4/1975 | Japan ................................. 524/145 |
| 1493393 | 11/1977 | United Kingdom . |
| 2099000 | 12/1982 | United Kingdom . |

*Primary Examiner*—Joseph L. Schofer
*Assistant Examiner*—J. M. Reddick
*Attorney, Agent, or Firm*—Curtis, Morris & Safford

[57] ABSTRACT

Curable casting resins comprising a liquid or liquefiable curable organic polymer precursor, a high content of finely divided inorganic filler, and a polymerizable organosilicon component as an adhesion promoter, the liquid phase formed from the organic components containing lecithin in amounts from 0.01 to 5 percent by weight of the casting resin.

13 Claims, No Drawings

CURABLE CASTING RESINS

This application is a continuation of application Ser. No. 902,890, filed Sept. 2, 1986, now abandoned.

The present invention relates to low viscosity casting resins which contain a high content of fillers and which can be cured conventionally, for example by the addition of an appropriate initiator both with and without the use of pressure.

THE PRIOR ART

The term "casting resin" is generally applied to synthetic resins which are liquid or can be liquefied by moderate heating and poured into molds.

German Pat. No. 2,449,656 and corresponding U.S. Pat. Nos. 4,221,697 and 4,251,576 teach stable, liquid or liquefiable, moldable, and curable masses composed of a polymerizable organic liquid and particulate inorganic fillers, which masses are obtained by dispersing a filler (B) in a component (A) in the presence of a dispering agent (C) and optionally in the presence of a binder (D), where (A), (B), (C), and (D) have the following meanings:

(A) A liquid organic precursor having a viscosity at the molding temperature of the curable mass of not more than 5.0 Pa.sec and composed of
  (A)(1) a liquid monomer or monomer mixture capable of forming a solid polymer by polymerization or polyaddition, in which polymer the repeating units in the polymer chain are linked by carbon-carbon bonds or by carbon-carbon bonds interrupted by the hetero atoms O,N, or Si; or of
  (A)(2) a mixture of one or more preformed polymers with one or more monomers, the monomeric component of which is capable of forming a solid polymer by polymerization or polyaddition; or of
  (A)(3) a partially polymerized material or a prepolymer capable of forming a solid polymer by polymerization or polyaddition;

(B) From 20 to 90 volume percent of at least one finely divided inorganic filler having a modulus of elasticity in shear of at least 5 G $Nm^{-2}$ and having a maximum particle size of at most 100 microns, with at least 95 percent of the particles having a size of at most 10 microns and with not more than 10 percent of the particles having a size of less than 0.1 micron;

(C) Not less than 0.01 $g.m^{-2}$, based on the total surface of the particles of component (B), of a polymeric dispersing agent having at least one polymer chain with a molecular weight of at least 500 which contains one or more anchoring groups capable of association with the filler (B), subject to the condition (a) that the polymer chain be selected so that it is solvatable by the liquid polymerizable component (A) to the extent that it, as an independent molecule, has significantly better solubility in component (A) than in a theta solvent; (b) that the polymeric dispersing agent is compatible with the product of polymerization of component (A); and (c) that the polymeric dispersing agent optionally contain functional groups capable of grafting or of copolymerization with the monomers present in component (A) during the cure;

(D) A low molecular weight binder having one or more groups capable of interaction with the groups present in component (B) and having one or more groups capable of being copolymerized or grafted with the polymer formed by polymerization of the liquid precursor (A).

In published German Patent Application DOS 33 31 371, casting resins comprising acrylic esters having a high content of finely dispersed fillers are proposed. These casting resins contain a mixture of organosilicon compounds with functional groups and metallic acid esters of metals of subgroups IV and V of the Periodic Table. The functional group of the organosilicon compound is ethylenically unsaturated and linked to the silicon atom either directly or through alkylene groups, and may be present once or repeatedly in the molecule. The addition of this mixture to a conventional casting resin produces a desired lowering of the viscosity of these resins, which are used in the manufacture of sanitary ware, for example.

THE OBJECT

Low viscosity casting resins containing a high content of finely divided fillers are desired. These fillers can contribute to the increased flexural strength and impact resistance of molded articles manufactured from the casting resins. High filler loadings are also desirable because they reduce the polymerization shrinkage which occurs during the cure of the casting resins, and in addition they shorten the curing times.

In the manufacture of the molded articles, a low viscosity of the casting resins is advantageous, of course, since it permits the molds to be filled accurately and completely. However, prior art solutions have not proved satisfactory in every respect. One of the main problems in the production of low viscosity casting resins with high filler loadings is the introduction of the inorganic filler into the organic phase, which is unsaturated because of the monomer content. Mineral fillers such as cristobalite, quartz powder, and the like cannot be added to the monomer mixture directly in amounts ranging from 50 to 80 weight percent, since this inevitably results in a friable mass that does not lend itself to pouring into a mold. To obtain good mechanical properties, a chemical bond must be established between the inorganic and organic phases. This bond can be created conventionally with organosilicon compounds.

According to published German Patent Application DOS No. 24 49 656 and the aforementioned corresponding U. S. patents, the introduction of the inorganic component into the organic phase is accomplished using polymeric dispersing agents. The preparation and handling of such polymeric dispersing agents are relatively costly and complicated. A lower cost solution is thus desirable.

Published German Patent Application DOS No. 33 31 371 uses organosilicon compounds with metallic acid esters of subgroups IV and V of the Periodic Table, with catalysis.

In the former case, deflocculation with the polymeric dispersing agent is followed by silanization with organosilicon compounds to achieve bonding between the organic and inorganic phases. In the latter case, the inorganic filler is deflocculated during silanization with organosilicon compounds and the metallic acid esters.

In practice, difficulties may be encountered, for example in removing the castings from the mold. This can be remedied by adding conventional mold release agents. Suitable release agents are metallic soaps such as metal stearates, for example, silicones, polymers such as polyamides and polyethylenes, talc, mica, and the like. However, release agents exhibit a tendency to concentrate at the surfaces, which detracts from the quality of the castings in the regions close to the surface. For evaluation, the hot water cycling test in conformity with European Standards Coordinating Committee TC 86, Part 2 (100° C.) may be employed, for example. The castings which can be produced with casting resins of the type described above include sanitary fixtures such as sinks, wash basins, etc. By and large, they show promise as substitutes for ceramic materials, whose production is relatively energy intensive.

THE INVENTION

It has been found that curable casting resins particularly well suited for accomplishing the above object and which comprise fluid or fluidizable curable polymer precursors with a high content of finely divided inorganic fillers are prepared, using organosilicon compounds as adhesion promoters, from an organic phase containing the curable components, and further containing not more than 5 weight percent and at least 0.01 percent of lecithin, by weight of the curable casting resins.

When the casting resins of the present invention are used, the concurrent use of release agents can be dispensed with.

THE ORGANIC PHASE

By definition, the organic phase comprises curable organic components in the form of a liquid polymer precursor. Suitable liquid polymer precursors are monomers or mixtures of monomers, preferably with the addition of prepolymers, capable of being polymerized with the aid of free radicals to give a polymer that is solid at room temperature. In this respect, the present invention utilizes the teachings of the prior art (for example, the precursors of published German Patent Application DOS No. 24 49 656 or corresponding U.S. Pat. No. 4,221,697). In general, the liquid polymer precursors have a viscosity not over 5 Pa.sec, and preferably not over 0.1 Pa.sec, at the molding temperatures.

Suitable monomers include vinyl or vinylidene monomers (cf. Ullmanns Enzyklopädie der Technischen Chemie, 3rd ed., Vol. 14, pp. 108–110, Urban & Schwarzenberg, 1963), for example vinyl esters and ethers, acidic vinyl compounds, vinylic carbonyl compounds, vinyl aromatics and heterocyclic vinyl compounds, olefins, halogenated olefins, and particularly derivatives of acrylic and methacrylic acid. In the latter case, monomers of the formula

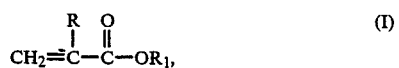

$$CH_2 = \overset{R}{\underset{|}{C}} - \overset{O}{\underset{\|}{C}} - OR_1, \quad (I)$$

wherein R is hydrogen or methyl and $R_1$ is straight chain or branched, unsubstituted or substituted alkyl having from 1 to 18 carbon atoms or an unsubstituted or substituted aryl having from 6 to 10 carbon atoms, are preferred. Illustrative of suitable substituents are conventional substituents such as halogen, hydroxy, alkoxy, and dialkylamino having $C_1$ to $C_{17}$ alkyl groups, and preferably $C_1$ to $C_6$ alkyl.

Particularly well suited monomers are compounds of formula (I) wherein $R_1$ represents alkyl having from 1 to 8 carbon atoms, and especially ethyl acrylate and methacrylate, propyl acrylate and methacrylate, butyl acrylate and methacrylate with the isomers, 2-ethylhexyl acrylate and methacrylate, phenyl acrylate and methacrylate, benzyl acrylate and methacrylate, and particularly methyl methacrylate. Moreover, the liquid polymer precursors may further contain conventional crosslinkable monomers such as those carrying at least two polymerizable vinyl groups in the molecule. (Cf. H. Rauch-Puntigam & Th. Völker, "Acrylund Methacrylverbindungen", p. 184, Springer Verlag, 1967.) Illustrative of these are, for example ethylene glycol dimethacrylate, 1,4-butanediol dimethacrylate, triglycol dimethacrylate, or trimethylolpropane trimethacrylate, and allyl compounds such as allyl methacrylate or triallyl cyanurate and allyl diglycol carbonate. Advantageously, the casting resin contains not more than 10 weight percent of crosslinking monomer. The crosslinker content generally ranges from 0.01 to 10 weight percent and preferably from 1 to 5 percent, based on the total weight of monomers.

Moreover, further monomers copolymerizable with esters of acrylic and/or methacrylic acid may be used as comonomers. These include the aforesaid vinyl aromatics and heterocyclic compounds, for example styrene, methylstyrenes such as alpha-methylstyrene, and divinylbenzene, vinylpyrrolidone, vinylpyridine, acrylonitrile and methacrylonitrile, vinyl esters such as vinyl acetate and propionate, vinyl chloride and vinylidene chloride. As a rule, derivatives of acrylic acid and methacrylic acid, and particularly the esters of formula (I) and of the crosslinking monomers, preponderate (over 50 weight percent). The content of these monomers may advantageously be up to 100 weight percent of the polymer precursor. A mixture of methyl methacrylate and a crosslinking monomer such as glycol dimethacrylate is particularly advantageous wherein the weight ratio is advantageously 100:2.

The liquid polymer precursor is advantageously composed of the monomers described, preferably with the addition of prepolymers. The prepolymers are usually composed of the same types of monomers as the monomers discussed above but do not contain any functionalized monomers. As a rule, the proportions given above for the monomers apply here, too. The monomeric constituents of the prepolymers may be the same as or different from the above monomers. The prepolymers are preferably dissolved in the monomers; however, they may also be dispersed therein. The prepolymers generally have molecular weights ranging from $10^4$ to $4(10)^5$ as determined by gel permeation chromatography. The prepolymers are added solely to control the viscosity.

The prepolymers are 0 to 20 percent, and preferably from 1 to 10 percent, by weight of the liquid polymer precursors. The concentration is markedly dependent on the reduced viscosity of the polymer. A prepolymer of methyl methacrylate and methyl acrylate in a weight ratio of 9:1 with a reduced viscosity of 110 ml/g will serve as an example.

THE LECITHIN CONTENT

The addition of lecithin to the organic phase containing the curable components is essential to the invention. Polymeric dispersing agents are excluded from the casting resins of the present invention. The effect significant for the present invention is produced by commercial types of lecithin. Thus there is no need to use specific specially purified or chemically treated lecithins. Lecithins are known to occur in all vegetable oils; however, only the products derived from soybeans, rape, and sunflowers are of commercial importance. In every case, phospholipids form the principal constituent of the lecithins. As a rule, the primary OH groups of the glycerin is esterified with a saturated fatty acid, and the secondary OH group with an unsaturated fatty acid. (Cf. Ullmanns Enzyklopädie der Technischen Chemie, 4th ed., Vol. 16, pp. 105-107, Verlag Chemie, and Kirk-Othmer, 3rd ed., Vol. 14, pp. 254-269, John Wiley & Son, 1981). The lecithins from soybeans primarily contain palmitic acid, stearic acid, palmitoleic acid, oleic acid, linoleic acid, and linolenic acid as the fatty acid component.

The iodine number (cf. Ullmanns Enzyklopädie der Technischen Chemie, 3rd ed., Vol 7, pp. 546–547, Urban & Schwarzenberg, 1956) of these products usually is about 95 and the saponification number (cf. Ullmanns Enzyklopädie der technischen Chemie, 4th ed., Vol. 11, p. 498, Verlag Chemie, 1976) about 190–200.

On the basis of the results available so far, the lecithins now on the market are suitable for use in carrying out the present invention.

The hydrophile-lipophile balance (HLB) of the common lecithin of commerce (fluid natural) is about 3.6. (See Becher and Birkmeier, J. Am. Oil Chem. Soc. 41, 3, 169 [1964]).

Advantageously, the lecithin to be used should dissolve as completely as possible in the polymer precursor. Moreover, it is advantageous if after dissolution the lecithin produces no coloration of the polymer precursor. These conditions can readily be checked by trial and error. In these respects, the commercial product Soja Lecithin STA of Gg. M. Langer & Co. (Lanco), Ritterhude bei Bremen, West Germany, has proved particularly satisfactory.

The amount of lecithin preferably ranges from 0.01 to not more than 5 weight percent, and more particularly from 0.1 to 5 weight percent, based on the casting resin. Advantageously, from 0.2 to 5 weight percent, and preferably 1 ±0.5 weight percent, of lecithin is added to the liquid polymer precursor.

THE FILLERS

Suitable fillers are the finely divided inorganic materials commonly used for casting resins. A particle diameter of 100 microns, and preferably 50 microns, should not be exceeded. Preferably, at least 95 percent of the particles are not over 10 microns. The preferred particle size range is 0.1 to 10 microns. Particles of a size of 0.1 micron or smaller should whenever possible not amount to more than 10 percent of the total number of particles. The particle size is determined by the usual methods. (Cf. B. Scarlett, "Filtration & Separation", p. 215, 1965). The particle size determination should be based on the largest dimension of the particles. Particles of granular shape are preferred.

Occasionally it may be advantageous to free the particles from absorptively bound moisture by heating to about 150° C. The water content can be further reduced by tempering. The fillers may be inorganic naturally occurring or synthetic products. The mechanical properties, such as hardness and modulus of elasticity in shear, should be as required by the intended end use of the casting resins. Formulation for a modulus of elasticity in shear of at least 5 G $Nm^{-2}$ may be advantageous. Minerals such as alumina and its derivatives, for example alkali metal and alkaline earth metal double oxides, or clays, silica in its various modifications, silicates, aluminosilicates, carbonates, phosphates, sulfates, sulfides, oxides, carbon, metals and metal alloys are suitable, for example. Synthetic materials such as glass powder, ceramics, porcelain, cinder, and finely divided synthetic $SiO_2$ are also suitable.

Suitable fillers include silicic acid modifications such as quartz (quartz powder), tridymite and cristobalite, kaolin, talc, mica, feldspar, apatite, barytes, gypsum, chalk, limestone, and dolomite. Optionally, mixtures of fillers may also be used. Fillers should represent at least 20 weight percent of the casting resins of the present invention. As a rule, a filler loading content of the casting resins between 50 and 80 weight percent will serve as a guide. The filler may be reduced to appropriate particle size by conventional methods, such as crushing and grinding. Cristobalite is particularly preferred.

THE ORGANOSILICON COMPONENT

The organosilicon component serves in known fashion as an adhesion promoter between filler and organic phase. The organosilicon compounds known from the prior art may therefore be used. When the organosilicon compounds in accordance with the present invention are employed, no use is generally made of metallic acid esters of metals of subgroup IV or subgroup V of the Periodic Table.

Primarily, functional organosilicon compounds having at least one ethylenically unsaturated group in the molecule are suitable. The functional group carrying the ethylenically unsaturated group is usually linked through a carbon atom to the central silicon atom. The remaining ligands on the silicon usually are alkoxy groups having from 1 to 6 carbon atoms, and there may also be ether bridges in the alkyl. Examples are the vinyl trialkoxysilanes. The carbon-carbon double bond may also be linked through one or more carbon atoms to the silicon atom, for example, as in the allyl trialkoxysilanes or the gamma-methacryloyloxypropyl trialkoxysilanes. Dialkoxysilanes may also be used, wherein a further functional group having a carbon-carbon double bond, usually of the same type, or alkyl preferably having from 1 to 6 carbon atoms, is attached to the silicon atom. Different types of organosilicon compounds may also be present in the organosilicon component.

Examples are vinyl trimethoxysilane, vinyl triethoxysilane, vinyl triacetoxysilane, vinyl tris(methoxyethoxy)silane, divinyl dimethoxysilane, vinyl methyldimethoxysilane, vinyl trichlorosilane, gamma-methacryloyloxypropyl trimethoxysilane or gamma-methacryloyloxypropyl tris(methoxyethoxy)silane.

The organosilicon compounds are advantageously used together with catalysts of the amine type, and particularly of the alkylamine type, having from 3 to 6 carbon atoms, and especially with n-butylamine, From 0.5 to 10 weight percent, and preferably from 1 to 5 percent, by weight of the organosilicon component, will serve as a guide for the use of the amine catalyst.

As a rule, the weight ratio of inorganic filler to organosilicon compound will range from 500:1 to 20:1 and preferably is 50±25:1.

PREPARATION OF CURABLE CASTING RESINS

The starting material in the preparation of the curable casting resins of the invention is preferably the liquid polymer precursor which contains the monomers and which, after the addition of the lecithin, forms the organic phase. As pointed out earlier, the lecithin should dissolve as completely as possible and should be uniformly dispersed. The finely divided inorganic filler is now introdced into and dispersed in the organic phase, advantageously with the aid of mechanical dissolvers. The operation is usually completed within 15 to 20 minutes. In general, a highly viscous suspension is formed at this stage. Silanization is then carried out by the addition of the organosilicon component, advantageously together with alkylamine as a catalyst. Silanization is advantageously aided by agitation, for example on a roller train for 24 hours. Alternatively, silanization can be effected by heating to 5° C. The prepolymer is then dissolved in the batch, and finally also the polymerization aids. During the silanization, the batch is transformed into a fully deflocculated low viscosity suspension. Advantageously, the organosilicon compound may be added to the liquid polymer precursor together with the lecithin right at the start.

Suitable polymerization aids are primarily conventional polymerization accelerators. In principle, any such accelerators giving a high free-radical yield even at low temperatures are well suited for use. (Cf. Brandrup-Immergut, "Polymer Handbook", 2nd ed., John Wiley & Son). Examples are the percarbonates, used in amounts of from 1 to 5 percent, by weight of the monomers. The accelerators are advantageously added only shortly before the resins are cured.

In addition to the finely divided fillers, reinforcements of the fibrous type, for example, may be added to the liquid casting resins of the invention. Suitable fibers are glass fibers, mineral fibers, and ceramic fibers, for example. The amount of these reinforcements is generally less than the content of finely divided fillers.

To be able to produce colored castings, pigments and/or dyes may further be added to the organic phase. The use of master batches, not novel per se, is also possible. These may be of the type prepared in accordance with published German Patent Application DOS No. 33 23 951, for example. Examples are the use of iron oxide, titanium dioxide, zinc white, ultramarine blue, and carbon black.

The casting resin of the invention has a nearly constant low viscosity level in the shear-rate range pertinent to further processing.

PRODUCTION OF CASTINGS

The curable liquid casting resin mixed with the accelerator can readily be poured into the usual molds. The mold is advantageously evacuated before it is filled. Curing is preferably carried out thermally, for example by heating to 50° C. to 80° C. for 15 to 30 minutes, advantageously in a forced draft oven. Curing may be carried out with or without the use of pressure. The casting resin of the invention can be used to fill a wide variety of molds and to carry out a technically satisfactory polymerization. Dishes, bowls, wash basins, sinks, toilet bowls, molded articles for the construction industry, machine foundations, tanks, etc., can be produced in this way. The advantages of this manufacturing method are: A great variety of shapes (even relatively complex shapes can be produced); low energy requirements; low labor requirement; a high degree of reliability; and minimal reworking time. Moreover, the casting resins of the invention are fairly easy to prepare and are ecologically innocuous. The castings made from them are distinguished by a flawless surface, high rigidity, and high strength.

The examples which follow will serve to illustrate the invention. Determination of the reduced viscosity is carried out in chloroform at 20° C. in an Ubbelohde microviscometer. (Cf. Houben-Weyl, Methoden der organischen Chemie, Vol. 14/1, pp. 81-84, Georg-Thieme-Verlag, 1961).

EXAMPLE 1

Preparation of casting resin 26.2 parts by weight of methyl methacrylate in admixture with 0.5 part by weight of ethylene glycol dimethacrylate are homogeneously mixed with 0.25 part by weight of lecithin (Soja Lecithin STA, product of M. Langer & Co., Ritterhude bei Bremen). 1.5 parts by weight of gamma-methacryloyloxyproyl trimethoxysilane and 0.025 part by weight of butylamine are then added. Into this batch 70 parts by weight of cristobalite (Cristobalite T 6000, particle-size range 0.1 to 10 microns, product of Quarzwerke, Cologne) are then introduced in a dissolver. The batch is then agitated for 24 hours on a roller train. A completely deflocculated, low viscosity dispersion is obtained. 1.5 parts by weight of a copolymer of methyl methacrylate and methyl acrylate (90:10 parts by weight) having a reduced viscosity of 110 ml/g (product "PLEX 8640F" of Röhm GmbH) are then added and the batch is agitated on the roller train to dissolution. The organosilicon compound can also be added right at the start, with comparably good results.

EXAMPLE 2

Production of a casting 0.6 part by weight of bis(4-tert.-butylcyclohexyl)-peroxydicarbonate is stirred as initiator into the casting resin of Example 1. This is followed by evacuation. The mixture is then used to cast sheets measuring 200×200 ×4 mm. Curing is carried out for about 25 minutes in a forced draft oven at 55° C. and then for 60 minutes at 80° C. From the sheets so obtained, standard test pieces measuring 50×6×4 mm are then sawed for determination of the flexural strength.

Determined were:

Flexural strength in conformity with DIN 53452: 135 N/mm$^2$

Impact resistance in conformity with DIN 53453: 6.0 kJ/m$^2$

EXAMPLE 3

Preparation of a casting resin

The procedure is the same as in Example 1 up to the addition of the cristobalite, gamma-methacryloxypropyl trimethoxysilane having been added at the very start. The batch is then heated within 30 minutes to 100° C. and then allowed to cool to room temperature. 1.5 percent by weight of the copolymer of methyl methacrylate and methyl acrylate ("PLEX 8640F") are then added, the further procedure being as in Example 1. Samples taken from a casting produced as in Example 2 exhibited an impact resistance (in conformity with DIN 53453) of 5.8 kJ/m$^2$.

What is claimed is:

1. A casting resin, curable in the presence of an agent generating free radicals, containing a high content of finely divided inorganic filler but being free of any polymeric functional dispersing agent, said casting resin comprising a liquid or liquefiable organic polymer precursor, from 20 to 80 percent, by weight of said casting resin, of a finely divided inorganic filler, a polymerizable organosilicon component as an adhesive promoter, and from 0.01 to 5 percent, by weight of said casting resin, of lecithin, said organic polymer precursor being selected from the group consisting of vinyl and vinylidene monomers and mixtures thereof and mixtures of a prepolymer, free of functional groups, dissolved or dispersed in such monomers or monomer mixtures.

2. A curable casting resin as in claim 1 wherein the organic polymer precursor comprises at least 50 percent by weight of at least one member selected from the group consisting of esters of acrylic acid and esters of methacrylic acid.

3. A curable casting resin as in claim 1 wherein the finely divided inorganic filler is from 50 to 80 percent by weight of the casting resin.

4. A curable casting resin as in claim 1 wherein the organic polymer precursor further comprises from 0.01 to 10 weight percent of a crosslinking monomer.

5. A curable casting resin as in claim 1 wherein said lecithin is derived from soybeans.

6. A curable casting resin as in claim 1 wherein said lecithin has a hydrophile-lipophile balance (HLB) of about 3.6.

7. A curable casting resin as in claim 1 wherein said lecithin is practically completely dissolved in said liquid phase formed from the organic components.

8. A curable casting resin as in claim 1 wherein a compound having at least one ethylenically unsaturated group in the molecule is used as the polymerizable organosilicon component.

9. A curable casting resin as in claim 8 wherein said polymerizable organosilicon component is gamma-methacryloyloxypropyl trialkoxysilane.

10. A curable casting resin as in claim 8 wherein an alkylamine is used as catalyst for the polymerizable organosilicon component.

11. A curable casting resin as in claim 1 wherein the weight ratio of filler to organosilicon component is from 500:1 to 20:1.

12. A curable casting resin as in claim 11 wherein the weight ratio of filler to organosilicon component is 50 ±25:1.

13. A curable casting resin as in claim 1 wherein the polymerizable organosilicon component is from the outset a constituent of the liquid phase formed from organic components.

* * * * *

UNITED STATES PATENT AND TRADEMARK OFFICE
CERTIFICATE OF CORRECTION

PATENT NO.  : 4,826,901

DATED       : May 2, 1989

INVENTOR(S) : Ittmann et al.

It is certified that error appears in the above-identified patent and that said Letters Patent is hereby corrected as shown below:

Column 7, line 10, replace "5°C." by -- 95°C. --.

Signed and Sealed this

Eighth Day of October, 1991

Attest:

HARRY F. MANBECK, JR.

*Attesting Officer*  *Commissioner of Patents and Trademarks*